United States Patent
Tepmongkol et al.

(10) Patent No.: US 10,127,717 B2
(45) Date of Patent: Nov. 13, 2018

(54) SYSTEM FOR 3D CLOTHING MODEL CREATION

(71) Applicant: Ohzone, Inc., Santa Clara, CA (US)

(72) Inventors: Warangkana Tepmongkol, Santa Clara, CA (US); John R. Myers, Westminster, CA (US); Richard W. Bunce, Boise, ID (US); Kevin P Acken, Mountain View, CA (US)

(73) Assignee: Ohzone, Inc., Santa Clara, CA (US)

( * ) Notice: Subject to any disclaimer, the term of this patent is extended or adjusted under 35 U.S.C. 154(b) by 0 days.

(21) Appl. No.: 15/436,481

(22) Filed: Feb. 17, 2017

(65) Prior Publication Data

US 2017/0287210 A1 Oct. 5, 2017

Related U.S. Application Data

(60) Provisional application No. 62/296,001, filed on Feb. 16, 2016.

(51) Int. Cl.
*G06T 17/00* (2006.01)
*G06T 7/33* (2017.01)
(Continued)

(52) U.S. Cl.
CPC .............. *G06T 17/00* (2013.01); *G06T 5/002* (2013.01); *G06T 7/337* (2017.01);
(Continued)

(58) Field of Classification Search
CPC .. G06T 11/60; G06T 19/00; G06T 2219/2004
See application file for complete search history.

(56) References Cited

U.S. PATENT DOCUMENTS 5,680,528 A 10/1997 Korszun
5,822,466 A 10/1998 Morfill et al.
(Continued)

FOREIGN PATENT DOCUMENTS

EP 2462564 B1 4/2014

OTHER PUBLICATIONS

Protopsaltou, D., Luible, C., Arevalo, M., & Magnenat-Thalmann, N. (2002). A body and Garment Creation Method for an Internet Based Virtual Fitting Room. In Advances in Modelling, Animation and Rendering (pp. 105-122). Springer London. https://doi.org/10.1007/978-1-4471-0103-1_7.
(Continued)

*Primary Examiner* — Phi Hoang
(74) *Attorney, Agent, or Firm* — Witkowski Law

(57) ABSTRACT

A system for creating a model of an article of clothing or other wearable, the system includes a mannequin or other model of at least a portion of a human form; a sensing device configured to scan the mannequin without the wearable to generate a first scan information and configured to scan the surface of the wearable on the mannequin to generate a second scan information; a processor communicatively coupled to the sensing device to receive the first and second scan information, the processor configured to: generate point clouds using the scan information; aligning the point clouds; generating a plurality of slices along at least one longitudinal axis through the point clouds, each slice having a centroid along a corresponding longitudinal axis; and generating a table having a plurality of entries each representing a distance between corresponding vertices for the pair of point clouds; the table representing the wearable.

23 Claims, 9 Drawing Sheets

(51) Int. Cl.
*G06T 5/00* (2006.01)
*H04N 13/02* (2006.01)
*H04N 13/282* (2018.01)

(52) U.S. Cl.
CPC ....... *H04N 13/0282* (2013.01); *H04N 13/282* (2018.05); *G06T 2207/10028* (2013.01); *G06T 2207/20182* (2013.01); *G06T 2210/16* (2013.01)

(56) References Cited

U.S. PATENT DOCUMENTS

| | | | |
|---|---|---|---|
| 5,850,222 | A | 12/1998 | Cone |
| 5,923,780 | A | 7/1999 | Morfill et al. |
| 5,930,769 | A | 7/1999 | Rose |
| 6,009,212 | A | 12/1999 | Miller et al. |
| 6,182,871 | B1 | 2/2001 | Lam |
| 6,307,568 | B1 | 10/2001 | Rom |
| 6,310,627 | B1 | 10/2001 | Sakaguchi |
| 6,404,426 | B1 | 6/2002 | Weaver |
| 6,415,199 | B1 | 7/2002 | Liebermann |
| 6,546,309 | B1 | 4/2003 | Gazzuolo |
| 6,556,196 | B1 | 4/2003 | Blanz et al. |
| 6,611,630 | B1 | 8/2003 | Miller et al. |
| 6,888,965 | B1 | 5/2005 | Rath et al. |
| 6,901,379 | B1 | 5/2005 | Balter et al. |
| 7,133,839 | B2 | 11/2006 | Inoue et al. |
| 7,149,665 | B2 | 12/2006 | Feld et al. |
| 7,328,177 | B1 | 2/2008 | Lin-Hendel |
| 7,355,597 | B2 | 4/2008 | Laidlaw et al. |
| 7,398,133 | B2 | 7/2008 | Wannier et al. |
| 7,433,753 | B2 | 10/2008 | Okada et al. |
| 7,492,934 | B2 | 2/2009 | Mundy et al. |
| 7,978,887 | B2 | 7/2011 | Mundy et al. |
| 8,170,919 | B2 | 5/2012 | Barbour et al. |
| 8,275,590 | B2 | 9/2012 | Szymczyk et al. |
| 8,290,568 | B2 | 10/2012 | Pichler et al. |
| 8,359,247 | B2 | 1/2013 | Vock |
| 8,364,561 | B2 | 1/2013 | Wolper et al. |
| 8,427,656 | B2 | 4/2013 | Hullin et al. |
| 8,438,081 | B2 | 5/2013 | Gray et al. |
| 8,515,145 | B2 | 8/2013 | Mundy et al. |
| 8,605,148 | B2 | 12/2013 | Robertson |
| 8,700,477 | B2 | 4/2014 | Wolper et al. |
| 8,711,175 | B2 | 4/2014 | Aarabi |
| 8,818,883 | B2 | 8/2014 | Lawrence et al. |
| 8,942,456 | B2 | 1/2015 | Hesthaven et al. |
| 9,147,207 | B2 | 9/2015 | Haaramo et al. |
| 9,189,886 | B2 | 11/2015 | Black et al. |
| 9,191,579 | B2 | 11/2015 | Seidel et al. |
| 9,241,184 | B2 | 1/2016 | Weerasinghe |
| 9,292,967 | B2 | 3/2016 | Black et al. |
| 9,489,744 | B2 | 11/2016 | Black et al. |
| 9,576,198 | B2 | 2/2017 | Mundy et al. |
| 9,679,409 | B2 | 6/2017 | Black et al. |
| 9,710,964 | B2 | 7/2017 | Loper et al. |
| 9,761,060 | B2 | 9/2017 | Black et al. |
| 9,799,098 | B2 | 10/2017 | Seung et al. |
| 9,898,848 | B2 | 2/2018 | Black et al. |
| 9,961,328 | B2 | 5/2018 | Wu et al. |
| 10,002,460 | B2 | 6/2018 | Black et al. |
| 10,008,007 | B2 | 6/2018 | Taubin et al. |
| 10,032,254 | B2 | 7/2018 | Harmeling et al. |
| 2001/0026272 | A1 | 10/2001 | Feld et al. |
| 2001/0042029 | A1 | 11/2001 | Galvez |
| 2003/0065578 | A1 | 4/2003 | Peyrelevade et al. |
| 2003/0076318 | A1 | 4/2003 | Shaw-Weeks |
| 2003/0101105 | A1 | 5/2003 | Vock |
| 2004/0049309 | A1 | 3/2004 | Gardner et al. |
| 2004/0083142 | A1 | 4/2004 | Kozzinn |
| 2004/0227752 | A1 | 11/2004 | McCartha et al. |
| 2005/0131776 | A1 | 6/2005 | Perotti et al. |
| 2005/0267614 | A1 | 12/2005 | Looney et al. |
| 2006/0202986 | A1 | 9/2006 | Okada et al. |
| 2006/0287877 | A1 | 12/2006 | Wannier et al. |
| 2007/0005174 | A1 | 1/2007 | Thomas |
| 2007/0057942 | A1* | 3/2007 | Unal ............... G06K 9/00214 345/419 |
| 2007/0130020 | A1 | 6/2007 | Paolini |
| 2007/0179867 | A1 | 8/2007 | Glazer et al. |
| 2007/0198120 | A1 | 8/2007 | Wannier et al. |
| 2008/0249897 | A1 | 10/2008 | Oh et al. |
| 2009/0018926 | A1 | 1/2009 | Buehlman |
| 2009/0089186 | A1 | 4/2009 | Paolini |
| 2009/0115777 | A1 | 5/2009 | Reyers Moreno |
| 2010/0094729 | A1 | 4/2010 | Gray et al. |
| 2010/0191770 | A1 | 7/2010 | Cho et al. |
| 2010/0238271 | A1* | 9/2010 | Pfeiffer ............... A43D 1/06 348/46 |
| 2010/0306082 | A1 | 12/2010 | Wolper et al. |
| 2011/0022965 | A1 | 1/2011 | Lawrence et al. |
| 2011/0078055 | A1 | 3/2011 | Faribault et al. |
| 2011/0298897 | A1 | 12/2011 | Sareen et al. |
| 2012/0022978 | A1 | 1/2012 | Manea et al. |
| 2012/0136755 | A1 | 5/2012 | Yang |
| 2012/0299912 | A1 | 11/2012 | Kapur et al. |
| 2013/0018763 | A1 | 1/2013 | Ajala |
| 2013/0083065 | A1 | 4/2013 | Schulze |
| 2013/0173226 | A1 | 7/2013 | Reed et al. |
| 2013/0215116 | A1 | 8/2013 | Siddique et al. |
| 2013/0249908 | A1 | 9/2013 | Black et al. |
| 2013/0293686 | A1 | 11/2013 | Blow et al. |
| 2014/0006386 | A1 | 1/2014 | Oh |
| 2014/0022238 | A1 | 1/2014 | Oh |
| 2014/0089135 | A1 | 3/2014 | Linh et al. |
| 2014/0108208 | A1 | 4/2014 | Piana |
| 2014/0149264 | A1 | 5/2014 | Satyanarayana et al. |
| 2014/0176565 | A1 | 6/2014 | Adeyoola et al. |
| 2014/0225888 | A1 | 8/2014 | Bell et al. |
| 2014/0368499 | A1 | 12/2014 | Kaur |
| 2015/0213646 | A1* | 7/2015 | Ma ............... G06T 17/20 345/420 |
| 2016/0035142 | A1 | 2/2016 | Nair et al. |
| 2016/0086353 | A1* | 3/2016 | Lukac ............... G06T 9/00 345/419 |
| 2016/0148436 | A1* | 5/2016 | Chang ............... G06T 19/20 382/106 |
| 2016/0150217 | A1* | 5/2016 | Popov ............... G06T 15/04 348/48 |
| 2017/0214943 | A1* | 7/2017 | Cohen ............... H04N 19/91 |
| 2017/0249783 | A1* | 8/2017 | Mach Shepherd ..... G06T 17/20 |

OTHER PUBLICATIONS

Apparel Highest-Selling Category in E-Commerce in 2015. (Apr. 4, 2016). Retrieved Feb. 11, 2017, from https://sourcingjournalonline.com/apparel-was-highest-selling-category-in-online-retail-in-2015/.

Cordier, Frédéric, Wonsook Lee, Hyewon Seo, and Nadia Magnenat-Thalmann. "Virtual-try-on on the web." Laval Virtual (2001).

Weiss, A., Hirshberg, D., & Black, M. J. (2011). Home 3D body scans from noisy image and range data. In 2011 International Conference on Computer Vision. IEEE. https://doi.org/10.1109/iccv.2011.6126465.

* cited by examiner

SYSTEM FOR 3D CLOTHING MODEL CREATION

CROSS-REFERENCE TO RELATED APPLICATIONS

This U.S. non-provisional application claims the benefit of U.S. provisional application No. 62/296,001, filed on Feb. 16, 2016, the contents of which are expressly incorporated by reference herein. This U.S. non-provisional application is related to the following commonly-owned U.S. patent applications, which are hereby expressly incorporated by reference in their respective entireties:

(1) U.S. non-provisional application entitled "System and Method for Virtually Trying-On Clothing", filed on Feb. 17, 2017, Ser. No. 15/436,514, which claims the benefit of U.S. provisional application No. 62/296,005, filed on Feb. 16, 2016;

(2) U.S. non-provisional application entitled "Virtually Sharing Customized Clothing", filed on Feb. 17, 2017, Ser. No. 15/436,580, which claims the benefit of U.S. provisional application No. 62/296,008, filed on Feb. 16, 2016.

(3) U.S. non-provisional application entitled "System and Method for Targeted Personalized Ads", filed on Feb. 17, 2017, Ser. No. 15/436,547, which claims the benefit of U.S. provisional application No. 62/296,013, filed on Feb. 16, 2016.

BACKGROUND

Technical Field

This disclosure relates generally to the field of representing a graphical object display modeling using mathematical algorithms. More particularly, the disclosure relates to creating three-dimensional models of clothing and other wearables.

Background Art

Description

One of the basic needs of human beings is clothing. In 2016, annual apparel sales were expected to exceed $1.4 trillion globally, and more than $300 billion in the United States. In 2015, apparel became the highest selling category in online retail within the United States, reaching about $75 billion in annual sales.

There are advantages in selling and purchasing clothing online. From the customers point of view, the time and effort to travel to the store may be avoided. They may purchase the clothing directly on their computer wherever they happen to be. From the retailer's point of view, the need for brick and mortar stores may be avoided altogether or reduced in number, thereby potentially saving retail store rents. The self-service nature of online sales may reduce the need for retail sales staff, and the associated costs.

There may also be disadvantages in selling and purchasing clothing online. In contrast to a customer who visits a brick-and-mortar retail store, an online customer cannot physically try on clothing before purchase. The lack of pre-sales fitting may increase the return rate because customers find that they are not satisfied with the fit or look of the clothing when they receive the order. The extra shipping and handling cost and effort of returned items can discourage purchases in the online sales channel, increase wear on unsold merchandise, and reduce profits.

E-commerce websites often display images of clothing dressed on mannequins or human models so that potential customers can visualize the clothes as they would be worn. These images are often generated by the manufacturer or the retailer to promote the product. These photographed professional models that may not represent the body type of the typical customer. However, many retailers also take photos of so-called plus-sized models and others that may represent more typical customers. These efforts may help potential customers better visualize the clothing on themselves.

When a potential customer visits a retail store, they typically have the option to try on in-stock clothing. They can verify which size of any such garments fit them and can see how the selected garment looks on them. They can try on clothing and get immediate feedback from the friends or family who visit the store with them. However, online purchases are fulfilled through centralized warehouses that may provide an advantage in terms of consolidated inventory. Consolidated inventory may allow a wider range of stocking units (SKUs) and sizes than can cost-effectively be maintained in inventory in each of numerous smaller retail stores.

Clothing retailers often provide generous return policies for clothing that is purchased online. This may encourage consumers to make online purchases of clothing despite the lack of a pre-sales fitting process.

SUMMARY

A system and method for capturing a 3D clothing model is disclosed.

The system captures a three-dimensional point cloud of the reference mannequin and a three-dimensional point cloud of the reference mannequin wearing an article of clothing or other wearable.

In some embodiments, the scan information is captured using at least one depth sensor. The depth sensors measure distance from the sensor to the surface of the naked or clothed reference mannequin. The reference mannequin or the sensor or both are moved in a controlled manner so that the sensor can capture surface positions of the entire surface of the naked or clothed reference mannequin. A processor processes the scan information using well-known techniques for depth sensor information to produce a point cloud representing the surface of the naked or clothed mannequin.

In some embodiments, the scan information is captured using at least one image sensor. The image sensor captures 2D images of the surface of the naked or clothed reference mannequin. The reference mannequin or the sensor or both are moved in a controlled manner so that the sensor can capture 2D images of the naked or clothed reference mannequin from various perspectives. A processor processes the scan information using well-known techniques for 2D images to produce a point cloud representing the surface of the naked or clothed mannequin.

The point cloud for the wearable and the point cloud for the reference mannequin are align using at least one key feature common to both point clouds. Key features may include at least one of shoulders, neck, armpits, and crotch.

The point clouds are sliced perpendicular to lengthwise axes and centroids are computed for each slice. In a preferred embodiment, the point clouds are represented in polar co-coordinates for processing.

Difference tables are generated by computing the distances between corresponding points in the point cloud for the wearable and the point cloud for the reference mannequin. Each entry in the difference table corresponds to a distance that is associated with a specific point in the point cloud of the reference mannequin. Color and texture information may also be associated which each difference. This color and texture represents the color and texture of the wearable.

In a preferred embodiment, these differences are computed in parallel for each slice using one or more graphics processing units.

Three-dimensional display modeling has been used to render images of people wearing clothing. Technicians use high-end 3-D animation software to manually create a library of clothing articles. Physical simulation of the clothing design and materials are then applied to the model to render an image of the clothing article worn by a person.

These methodologies can require expensive highly skilled technicians to run the animation software. The work can be labor-intensive and time-consuming. The physical simulation and rendering can require substantial computer resources. In some cases, these methodologies can take 20-60 minutes on the fastest cloud processor.

Given the number of stock keeping units (SKUs) in a clothing line, including variations in sizes and materials, the significant skilled labor, time, and compute resources to generate 3D models for each clothing line would be substantial.

The simple scan process described herein does not require operators skilled in computer graphics or physical modeling. There does not need to be any complex physical simulation as to how the wearable will look on the model of the human body. The position of the surface of the wearable on the reference model is captured as it is actually positioned on the reference mannequin during the scan operation. An operator might just press a button to scan a reference mannequin, dress the reference mannequin with a wearable and press the button again to scan the dressed mannequin. A difference table for that wearable could be automatically created.

Prior art systems use complex graphical representations of both the mannequin and the wearable that necessitates significant complex computations to render as an image of the mannequin wearing the wearable. In some embodiments, this may take on the order of 20-60 minutes per rendering.

In contrast, the difference tables are simply tables of scalar adjustments to associated points in a point cloud for the reference mannequin. Because of the simplified computations required, and the facilitation of parallel processing of each slice, each clothing article might take on the order of 3-5 minutes.

In one embodiment, the difference tables for wearables are used with as disclosed in U.S. non-provisional application entitled "System for Virtually Trying On Clothing", filed on Feb. 17, 2017, Ser. No. 15/436,514.

DETAILED DESCRIPTION

Various examples of embodiments will be described below with reference to the drawings. The following exemplary embodiments are illustrative and are not to be construed as limiting.

Figure 1:
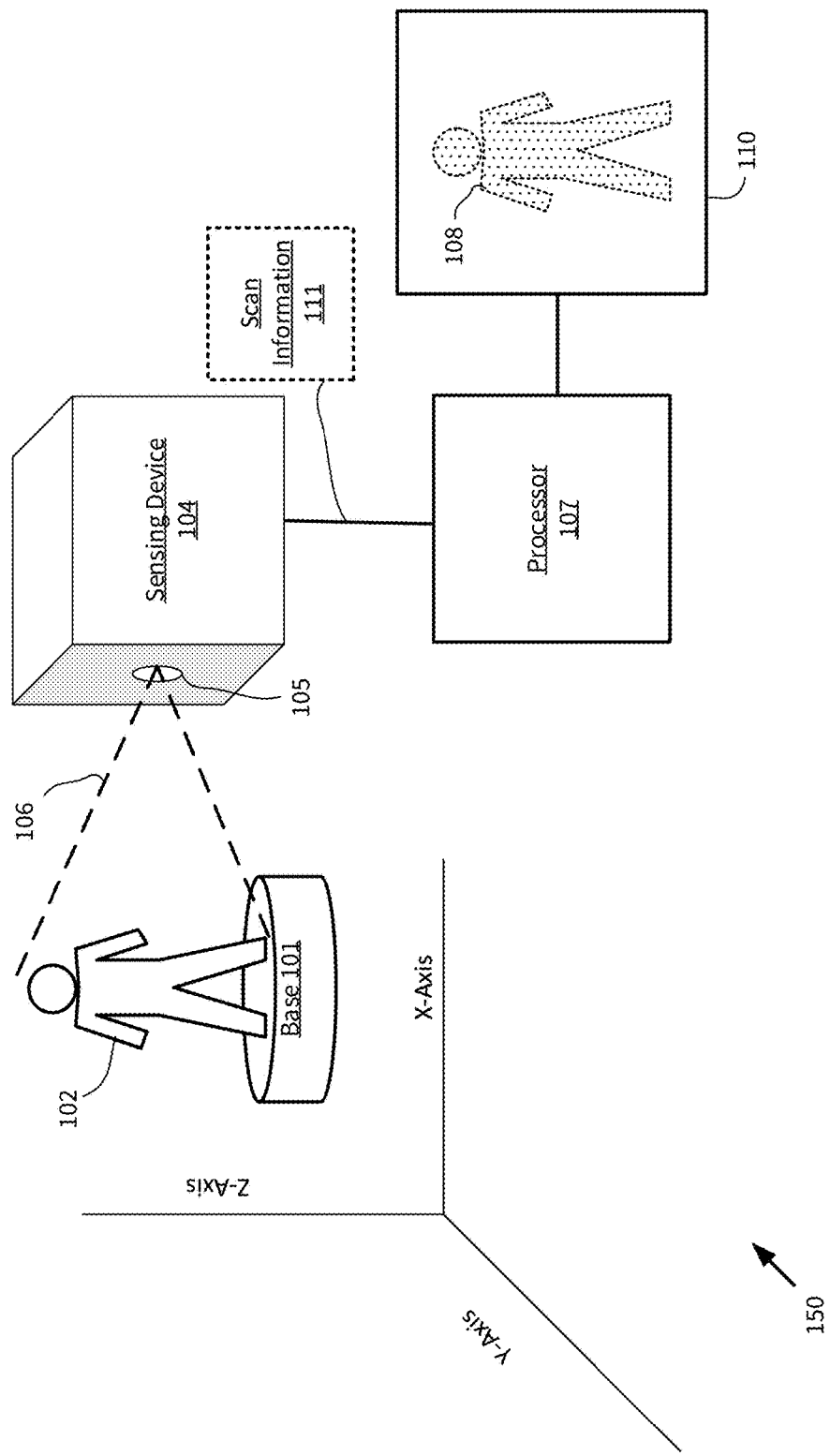
FIG. 1 illustrates one embodiment of a system for creation of three dimensional (3D) clothing models using a reference mannequin.

FIG. 1 illustrates one embodiment of a system 100 for creation of three dimensional (3D) clothing models shown with a reference mannequin 102 mounted on a base 101. The reference mannequin 102 has realistic features and proportions to accommodate clothing and other wearables as described herein. If features and proportions are not realistic, worn clothing may hang on the body in a way that does not realistically portray its fit and look on a human being. Body features that may be less relevant to fit, like genitalia, may be omitted or obscured on the mannequin 102.

A sensing device 104 is configured to receive information through a sensing input 105 under the control of a processor 107.

In some embodiments, the sensing device 105 is a depth sensor configured to measure the distance from the sensing input 105 to the surface of the reference mannequin 102 at one or more surface points within the field of view 106 of the sensing input 105.

In some embodiments, the sensing device 104 includes a sensing input 105 that has a single depth sensor that is moved in a controlled manner around the periphery of the mannequin 102 to capture the depth information from multiple perspectives around the mannequin 102. By tracking the relative motion between the sensing input 105 and the mannequin 102 for each of the depth measurements, the sensing device 104 can determine surface position information at various points on the reference mannequin 102. This information can be processed to produce a point cloud representing the scanned portion of the reference mannequin 102. Collectively, point cloud information represents the surface shape of the mannequin 102.

In other embodiments, the sensing device 104 remains in a fixed position and the base 101 is rotated through a 360° rotation in synchronization with the sensing input 105 of the sensing device 104 to gather the depth information from multiple perspectives around the mannequin 102.

In yet other embodiments, both the base 101 and the sensing device 104 are configured to move to gather the depth information from multiple perspectives around the mannequin 102.

In some embodiments, the sensing device 104 surrounds the mannequin 102 and the sensing input 105 includes an array of depth sensors dispersed around the mannequin 102 to capture all the depth information from multiple perspectives around the mannequin 102 in parallel.

Between the extremes of capturing all depth sensor information in parallel, and capturing each depth sense measurement in sequence, there may be smaller arrays of depth sensors that are moved around the reference mannequin 102 to capture the depth sensor information. More depth sensors allow more scanning to be performed in parallel which may lead to faster scan results. However, more depth sensors may require larger and more expensive scanning devices.

A scan information 111 is received by a processor 107. The scan information 111 includes each of the multiple depth measurements and the position of the associated sensor for each of the measurements. The scan information 111 may also include color and texture information at each of the points. The processor 107 processes the first scan information 111 according to well-known methods for processing depth information to generate a first point cloud 108 and stores the first point cloud 108 in a database 110. The first point cloud 108 is a constellation of points indicating the relative position of the surface of the mannequin 102 and color and/or texture information at those points as derived from the scan information 111.

In an alternative embodiment, the sensing device 104 is a two-dimensional (2D) image sensor that captures an image of the mannequin 102 from various perspectives around the mannequin 102 as described with reference to the depth sensor(s).

The first scan information 111 is received by the processor 107. The first scan information 120 includes each of the multiple 2D images and the associated perspectives of the one or more image sensors. The processor 107 processes the scan information 111 according to well-known methods for processing 2D image information to generate a point cloud 108 and transmits the first point cloud 108 into a database 110. The point cloud 108 is a constellation of points indicating the relative position of the surface of the mannequin 102 and color and/or texture information at those points as derived from the scan information 120.

It will be apparent that other schemes for moving one or more sensors around the periphery of the mannequin 102 may be used to generate the scan information 111.

Figure 2:
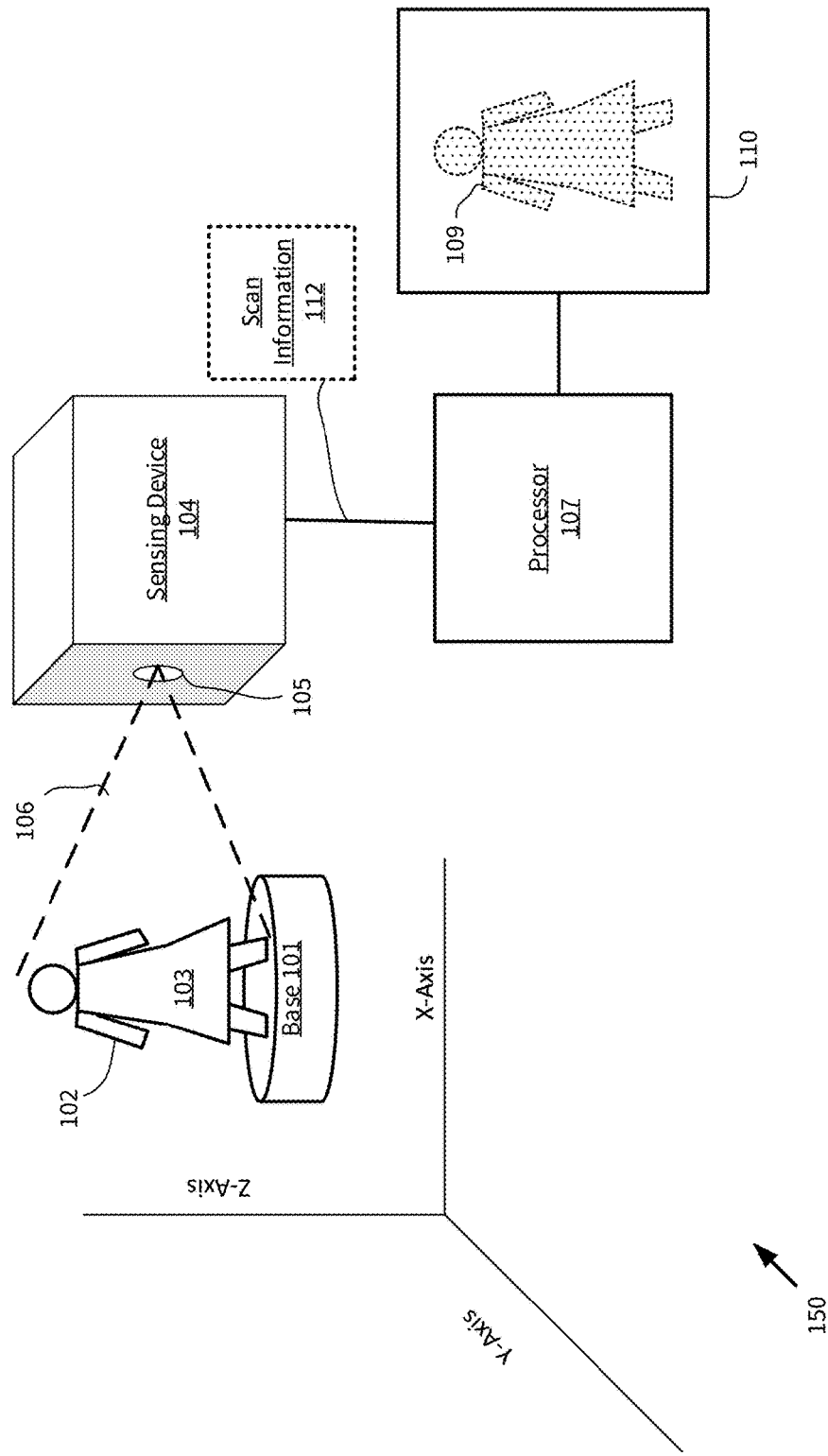
FIG. 2 illustrates one embodiment of a system of FIG. 1 using a reference mannequin wearing an article of clothing or other wearable.

FIG. 2 illustrates the system 100 of FIG. 1 with the reference mannequin 102 wearing a dress 103.

The sensing device 104 is operated as described with reference to FIG. 1 to capture a scan information 112.

In embodiments of the system 100 that use one or more depth sensors, the second scan information 112 includes each of the multiple depth measurements and the associated perspectives for each of the measurements. The processor 107 receives the scan information 112 and processes the scan information 112 according to well-known methods for processing depth information to generate a point cloud 109 and transmits the first point cloud 107 over a bus into a database 109. The point cloud 109 is a constellation of points indicating the relative position of the surface of the mannequin 102 wearing the dress 103 and color and/or texture information at those points as derived from the scan information 112.

In embodiments of the system 100 using one or more 2D image sensors, the scan information 112 includes each of the multiple images and the associated perspectives of each of the Images. The processor 106 processes the second scan information 120 according to well-known methods for processing 2D image information to generate a second point cloud 108 and transmits the second point cloud 108 into a database 109. The second point cloud 108 is a constellation of points indicating the relative position of the surface of the mannequin 102 and color and/or texture information at those points as derived from the scan information 112.

Figure 3:
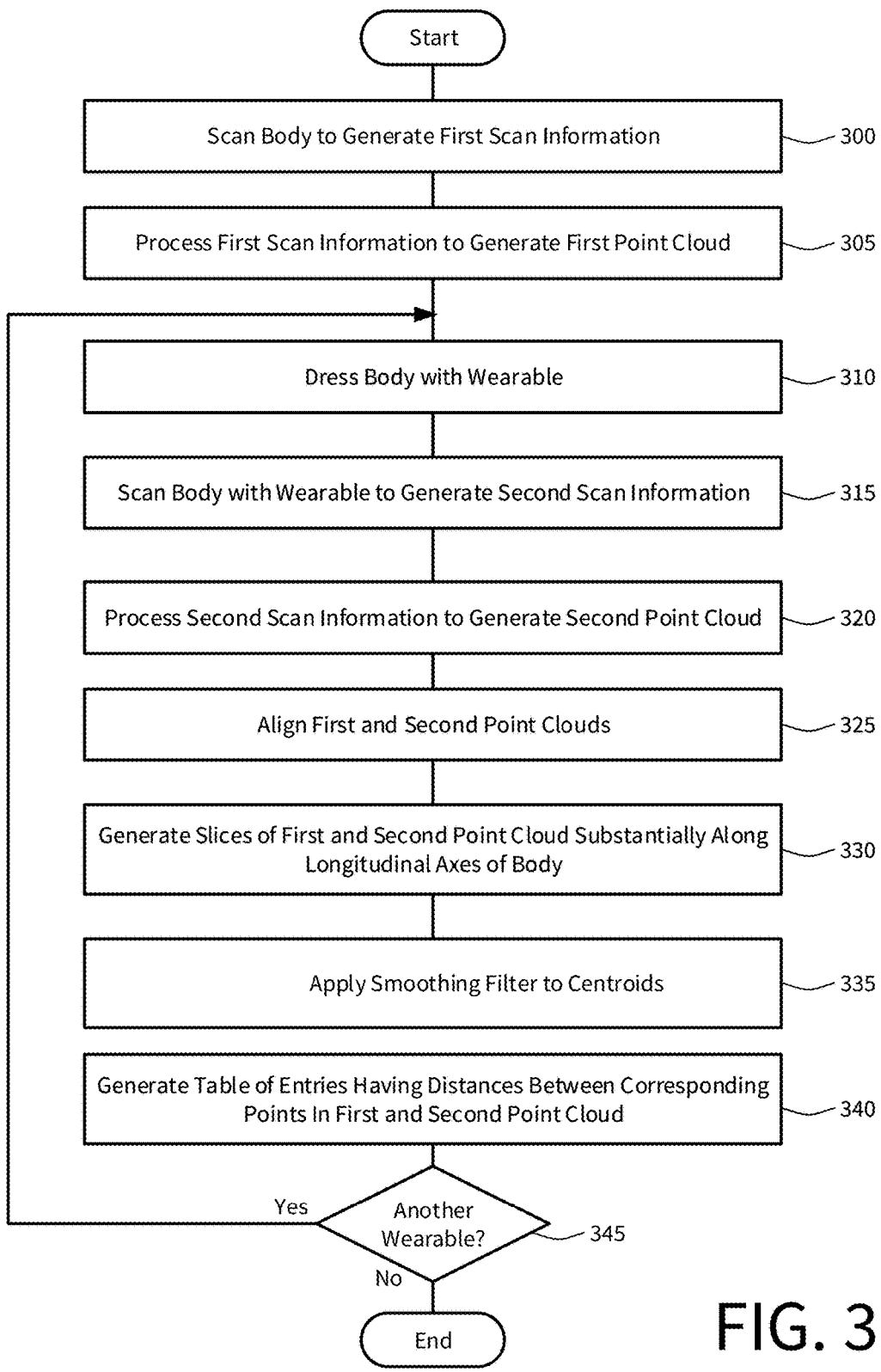
FIG. 3 shows one embodiment of a process for creating 3D clothing models described with reference to FIGS. 1 and 2.

FIG. 3 shows one embodiment of a process of creating 3D clothing models described with reference to FIGS. 1 and 2.

In step 300, the reference mannequin 102 is scanned to generate the scan information 111 as described with reference to FIG. 1.

In step 305, the processor 107 processes the scan information to generate the point cloud 108 as described with reference to FIG. 1. The point cloud 108 is used as a reference point cloud for processing with each of the subsequent point clouds.

In Step 310, the reference mannequin 102 is dressed with a wearable.

In some embodiments, the wearable is one of various types of clothing such as pants, shorts, dresses, skirts, shirts, blouses, stockings, gloves, hats, and the like. In some embodiments, the wearables include accessories such as eyeglasses, sunglasses, rings necklaces and earrings.

Generally, the process is performed with a single wearable for each scan so that the model generated by this process is associated with the individual wearable. In some cases, however, more than one wearable may be processed together as part of a set, such as a two-piece bikini.

In step 315, the reference mannequin 102 is scanned to generate the scan information 112 as described with reference to FIG. 2.

In step 320, the processor 107 receives the scan information 112 and processes the scan information 112 to generate the point cloud 109 as described with reference to FIG. 2.

In step 325, the point cloud 109 is aligned with the point cloud 108.

The point cloud 109 is a 3D surface representation of the reference mannequin 102 wearing the wearable. The point cloud 108 is a 3D surface representation of the reference mannequin 102 without the wearable.

In some embodiments, the point cloud 109 is aligned with the point cloud 108 by aligning key features in both point clouds. Key features may include the shoulder, neck, armpit or crotch, for example. Pattern recognition may be used to locate these key features in each of the point cloud 109 and the point cloud 108 even on a point cloud which covers some of these key features.

In step 330 the aligned point clouds are separated into slices by the various feature of the reference mannequin. Separating the point cloud into slices allows for more effective processing, including parallel processing by graphics processing units.

The body is generally sliced perpendicular to the lengthwise axis for each body feature. For example, the slices in the arms are sliced perpendicular to the lengthwise axis of each arm. The slices in the legs are cut perpendicular to the axis along the lengthwise axis of each leg. The slices in the torso are cut perpendicular to the lengthwise axis of each trunk. The slices in the torso are cut perpendicular to the lengthwise axis of each trunk. Similarly, the head, hands and feet are cut along the associated lengthwise axis.

The sizes of the slices may vary depending on the relative size of the feature and detail required for that feature of the body. For example, the fingers may be split into smaller slices that the legs.

Centroid are computed for each slice. In a preferred embodiment, the point clouds are represented in polar coordinates. However, other representation systems may be used.

In step 345, a smoothing filter is applied to the centroids. The filter removes discontinuities and other irregularities in the positing of the slices along the lengthwise axis of each portion of the point cloud.

In step 340, a table of entries having distances between corresponding points in the first and second point cloud are generated and stored in a database.

In step 345, it is determined whether another wearable will be scanned during this batch process. If so, the currently worn wearable is removed and the process continues at step 310 using the same reference point cloud that was initially captured in steps 300-305.

In some embodiments, similar processing is perform used only a reference body representing only a portion of a human body. For example, a reference body limited to the portion of the body below the waist might be used to create 3D model of pants and skirts. A reference body limited to the torso might be used to create 3D models of shirts and blouses. A reference body limited to one or both legs might be used to create 3D models of stockings or socks.

In some embodiments, the point clouds include polygon meshes with color and texturing.

Figure 4:
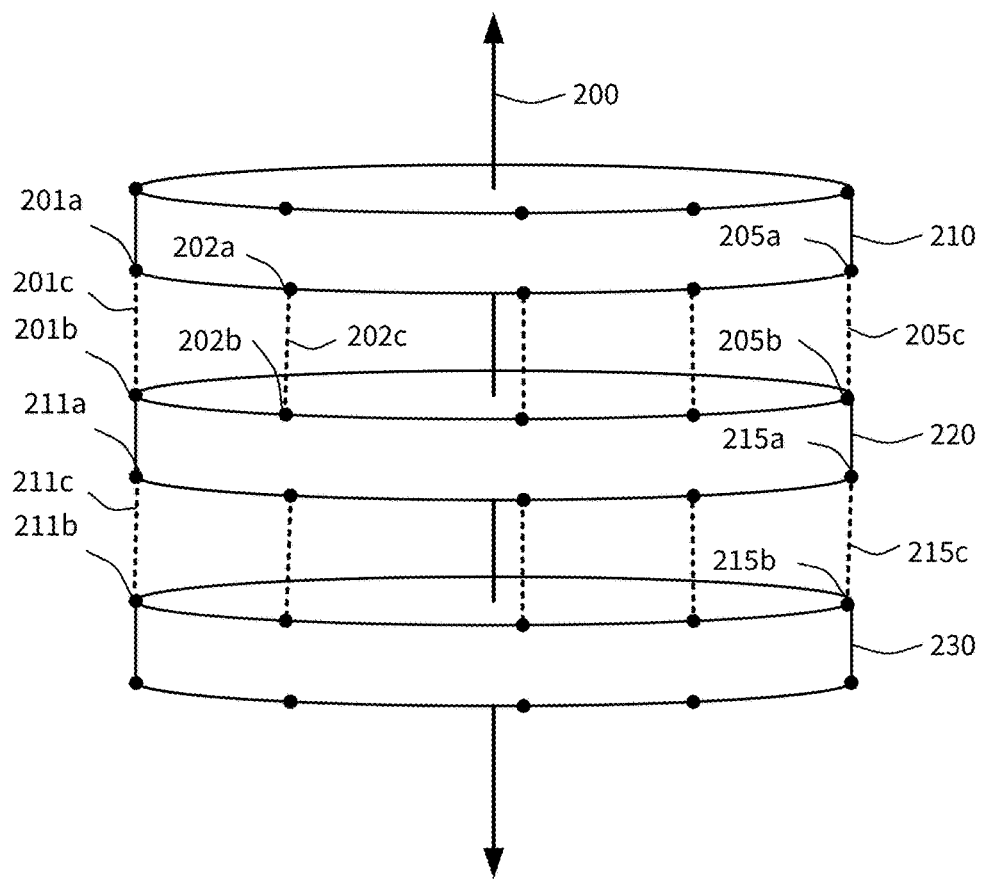
FIG. 4 illustrates one embodiment of a segment of a sliced point cloud.

FIG. 4 illustrates one embodiment of a segment of a sliced point cloud. The segment includes a slice 210, a slice 220 and a slice 230.

A lengthwise axis 200 passes through the centroids at the center of each slice.

A point 201a is a point at the boundary between slices. Only a few sample points are shown in the figure. In some embodiments, a slice may have approximately five thousand points dispersed around the sidewall of the slice to represent the surface of the scanned object.

A point 201b represents the same point on the scanned object as the point 201a but it is assigned to the slice 220. The point 201a and the point 201b are associated with each other by a connection link 201c.

Similarly, a point 202a and a point 202b represent the same point on the scanned object but the point 202a is assigned to the slice 210 and the point 202b assigned to the slice 220. The point 202a and the point 202b are associated with each other by a connection link 202c.

Similarly, a point 205a and a point 205b represent the same point on the scanned object but the point 205a is assigned to the slice 210 and the point 202b assigned to the slice 220. The points 205a and 205b are associated with each other by a connection link 205c.

Similar relationships are created at the boundary between the slice 220 and the slice 230. A point 211b represents the same point on the scanned object as a point 211a. Point 211a is assigned to the slice 220 and the point 211b is assigned to the slice 230. The point 211a and the point 211b are associated with each other by a connection link 211c.

Similarly, a point 215a and a point 215b represent the same point on the scanned object but the point 215a is assigned to the slice 220 and the point 215b is assigned to the slice 230. The point 215a and the point 215b are associated with each other by a connection link 215c.

A scanned object may be represented by long sequences of slices connected using the illustrated principals.

Collectively, the connection links make up a connection map that capture the relationships between the points at the edges between the slices so that the slices can be reassembled after processing. The slices are reassembled by bringing the slices together and removing each redundant point linked at the boundary.

In some embodiments, the point cloud shown represents a portion of the reference mannequin. In other embodiments, the point cloud shown represents a portion of the wearable being worn by the reference mannequin.

In a preferred embodiment, the point cloud of the wearable and the point cloud for the reference mannequin are aligned and sliced as described herein so that each slice for the wearable has a corresponding slice for the reference mannequin. The corresponding slices are associated with the same portion of the reference mannequin. These corresponding slices can be processed together independently of the other slices thereby enabling parallel processing for better performance.

Figure 5:
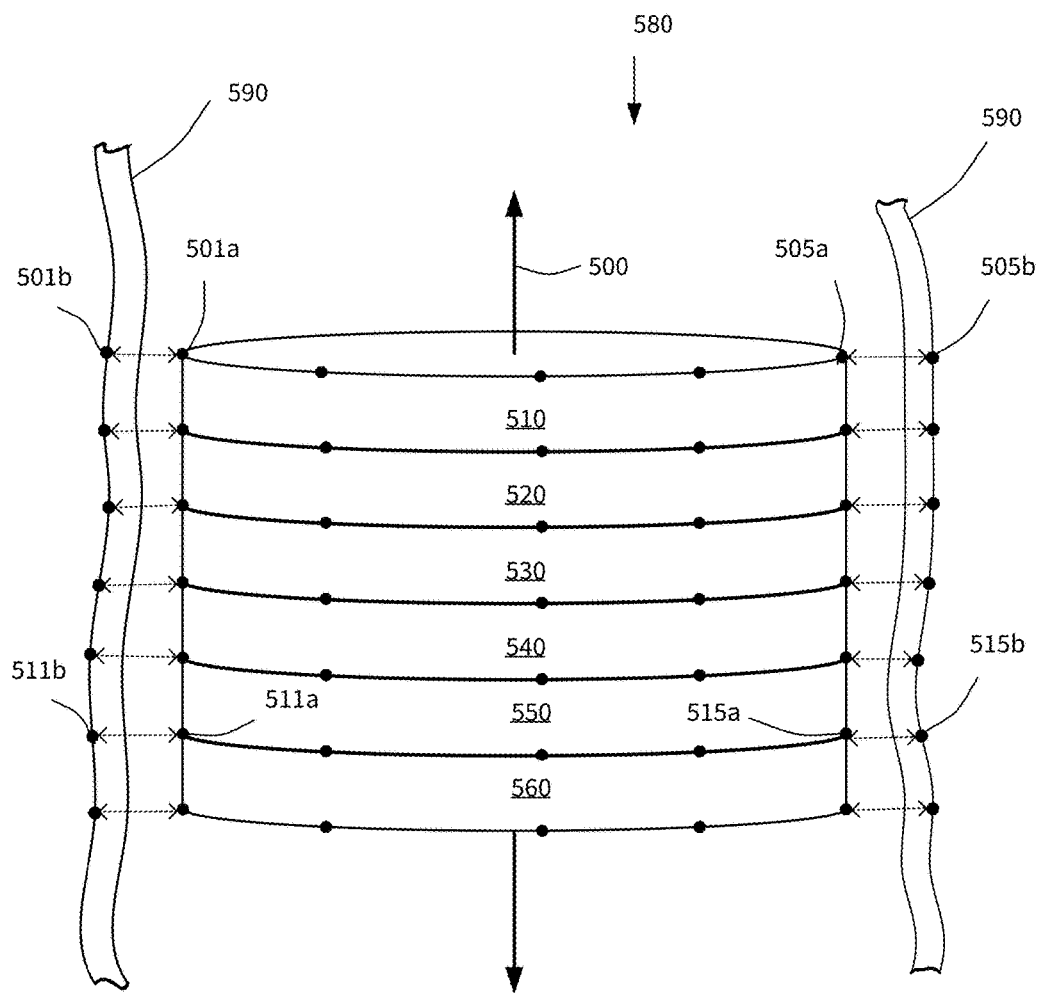
FIG. 5 illustrates one embodiment of a segment of a point cloud for a reference mannequin and a cross section of a point cloud for a wearable.

FIG. 5 illustrates one embodiment of a segment of a point cloud 580 for the reference mannequin that has been reassembled from a slice 510, a slice 520, a slice 530, a slice 540, a slice 550, and a slice 560, having a lengthwise axis 500 crossing through the centroid of each slice. A point cloud for a reference mannequin is typically made up of many more slices, and may have many different lengthwise axes for certain features depending on the relative orientation of the segments for portions of the arms, legs, and trunk, for example.

The segment of the point cloud 580 may represent a portion of a leg of the reference mannequin and the segment of the point cloud 590 may represent the leg portion of a pair of pants.

Only a cross-section portion of the point cloud 590 is shown. It is common for the point cloud of the wearable to wrap around the point cloud 580. The point cloud 590 is also separated into slices. The portion of the point cloud 590 that wraps in front of and behind the segment of the point cloud 580 is not shown to clearly illustrate the computation of a difference table representing the 3D positions of the point cloud 590 as offset from the point cloud 580.

The slices (not shown) for the point cloud 590 are aligned with the slices of the point cloud 580 using key features common to both point clouds as described herein.

These point clouds are shown with the slices assembled because that is the positioning which is analogous to the real-world scenario of a wearable wrapped around a portion of a reference mannequin. Thus, a human is better able to intuitively understand the relationships discussed during the calculations. However, the following calculations are generally performed on slices that have been separated as shown in FIG. 4 so that slices can be efficiently processed in parallel by graphics processing units.

A point 501b in the point cloud 590 represents a point on the surface of the wearable 109 at a slice (not shown) that is aligned with a point 501a in the point cloud 590 that represents a point on the surface of the reference mannequin 102 at the slice 510. The distance between the point 501b and the point 501a represents the distance that the surface of the wearable 109 is positioned from the surface of the underlying reference mannequin.

Similarly, on the opposite side of the point cloud 580, a point 505b in the point cloud 590 represents a point on the surface of the wearable 109 at a slice (not shown) that is aligned with a point 505a in the point cloud 590 that represents a point on the surface of the reference mannequin 102 at the slice 510. The distance between the point 501b and the point 501a represents the distance that the surface of the wearable 109 is positioned from the surface of the underlying reference mannequin.

A point 511b in the point cloud 590 represents a point on the surface of the wearable 109 at a slice (not shown) that is aligned with a point 511a in the point cloud 590 that represents a point on the surface of the reference mannequin 102 at the slice 550. The distance between the point 511b and the point 511a represents the distance that the surface of the wearable 109 is positioned from the surface of the underlying reference mannequin.

Similarly, on the opposite side of the point cloud 580, a point 515b in the point cloud 590 represents a point on the surface of the wearable 109 at a slice (not shown) that is aligned with a point 515a in the point cloud 590 that represents a point on the surface of the reference mannequin 102 at the slice 550. The distance between the point 515b and the point 515a represents the distance that the surface of the wearable 109 is positioned from the surface of the underlying reference mannequin.

There are numerous other points in the point cloud 580, not only at the boundaries between the slices, but along the sides within each slice to define the contours of the surface along the side walls of each slice. Similarly, there are numerous other points in the point cloud 590, not only at the boundaries between the slices, but along the sides within each slice to define the contours of the surface along the side walls of each slice. A scalar distance is computed between the corresponding points in the point cloud 590 and the point cloud 580 and stored in a table and each distance is associated with each slice and point of the reference mannequin. These distances are also referred to as a difference, and the table is sometimes referred to as a difference table.

Figure 6:
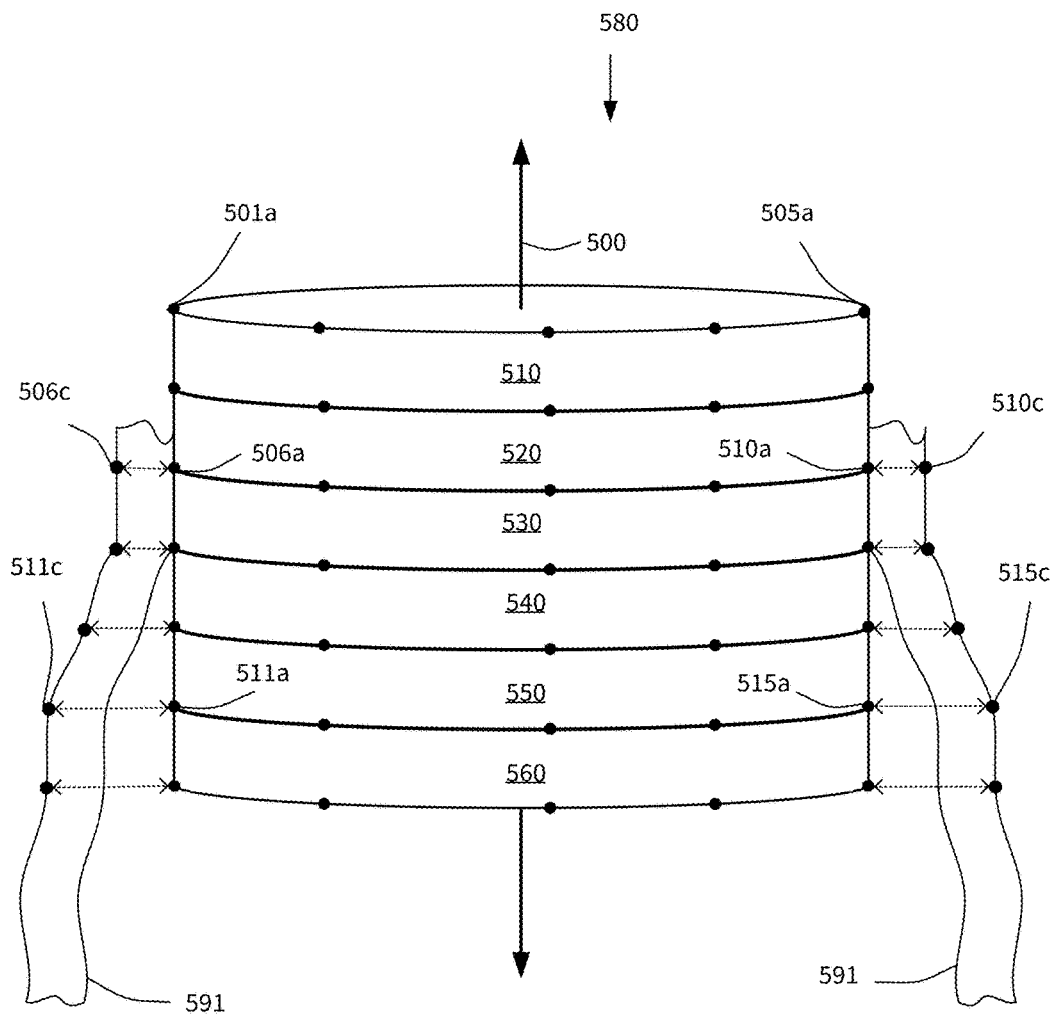
FIG. 6 illustrates another embodiment of a segment of a point cloud for a reference mannequin and a cross section of a point cloud for a wearable.

FIG. 6 illustrates one embodiment of a segment of a point cloud 580 for the reference mannequin that has been reassembled from a slice 510, a slice 520, a slice 530, a slice 540, a slice 550, and a slice 560, having a lengthwise axis 500 crossing through the centroid of each slice. A point cloud for a reference mannequin is typically made up of many more slices, and may have many different lengthwise axes for certain features depending on the relative orientation of the segments for portions of the arms, legs, and trunk, for example.

The segment of the point cloud 580 may represent a portion of the reference mannequin and the segment of the point cloud 590 may represent a portion of a wearable 591.

Only a cross-section portion of the point cloud 591 is shown. It is common for the point cloud of the wearable to wrap around the point cloud 580. The point cloud 591 is also separated into slices. The portion of the point cloud 591 that wraps in front of and behind the segment of the point cloud 580 is not shown to clearly illustrate the computation of a difference table representing the 3D positions of the point cloud 591 as offset from the point cloud 580.

The slices (not shown) for the point cloud 591 are aligned with the slices of the point cloud 580 using key features common to both point clouds as described herein.

These point clouds are shown with the slices assembled because that is the positioning which is analogous to the real-world scenario of a wearable wrapped around a portion of a reference mannequin. Thus, a human is better able to intuitively understand the relationships discussed during the calculations. However, the following calculations are generally performed on slices that have been separated as shown in FIG. 4 so that slices can be efficiently processed in parallel by graphics processing units.

The point cloud 591 is for a simplified wearable not to scale with reference to the slices. It is primarily configured here to illustrate various exemplary relationships between the point cloud for a wearable and the point cloud for the reference mannequin for the purposes of computation of a difference table.

The cross-section portion of the point cloud 591 does not extend over the portion of the slice 510. The point cloud 580 has a point 501a and a point 505a as derived from the scan process of the reference mannequin. When the wearable is scanned, the surface points captured at the slice 510 will be the same as that captured for the naked reference mannequin since the mannequin is naked at this slice. In a preferred embodiment, the system determines whether points such as the point 501a is included within the point cloud for the 591 and the point cloud for 580, or such corresponding points are within a certain minimum scanner resolution so as to be treated as the same point. The difference between these corresponding points in the point cloud 591 and the point cloud 580 is zero. In a preferred embodiment, an entry in the difference table is not created for such points.

A point 501b in the point cloud 590 represents a point on the surface of the wearable 109 at a slice (not shown) that is aligned with a point 501a in the point cloud 590 that represents a point on the surface of the reference mannequin 102 at the slice 510. The distance between the point 501b and the point 501a represents the distance that the surface of the wearable 109 is positioned from the surface of the underlying reference mannequin.

Similarly, on the opposite side of the point cloud 580, a point 505b in the point cloud 590 represents a point on the surface of the wearable 109 at a slice (not shown) that is aligned with a point 505a in the point cloud 590 that represents a point on the surface of the reference mannequin 102 at the slice 510. The distance between the point 501b and the point 501a represents the distance that the surface of the wearable 109 is positioned from the surface of the underlying reference mannequin.

A point 511b in the point cloud 590 represents a point on the surface of the wearable 109 at a slice (not shown) that is aligned with a point 511a in the point cloud 590 that represents a point on the surface of the reference mannequin 102 at the slice 550. The distance between the point 511b and the point 511a represents the distance that the surface of the wearable 109 is positioned from the surface of the underlying reference mannequin.

Similarly, on the opposite side of the point cloud 580, a point 515b in the point cloud 590 represents a point on the surface of the wearable 109 at a slice (not shown) that is aligned with a point 515a in the point cloud 590 that represents a point on the surface of the reference mannequin 102 at the slice 550. The distance between the point 515b and the point 515a represents the distance that the surface of the wearable 109 is positioned from the surface of the underlying reference mannequin.

There are numerous other points in the point cloud 580, not only at the boundaries between the slices, but along the sides within each slice to define the contours of the surface along the side walls of each slice. Similarly, there are numerous other points in the point cloud 590, not only at the boundaries between the slices, but along the sides within each slice to define the contours of the surface along the side walls of each slice. A scalar distance is computed between the corresponding points in the point cloud 590 and the point cloud 580 and stored in a table and each distance is associated with each slice and point of the reference mannequin. These distances are also referred to as a difference, and the table is sometimes referred to as a difference table.

Figure 7:
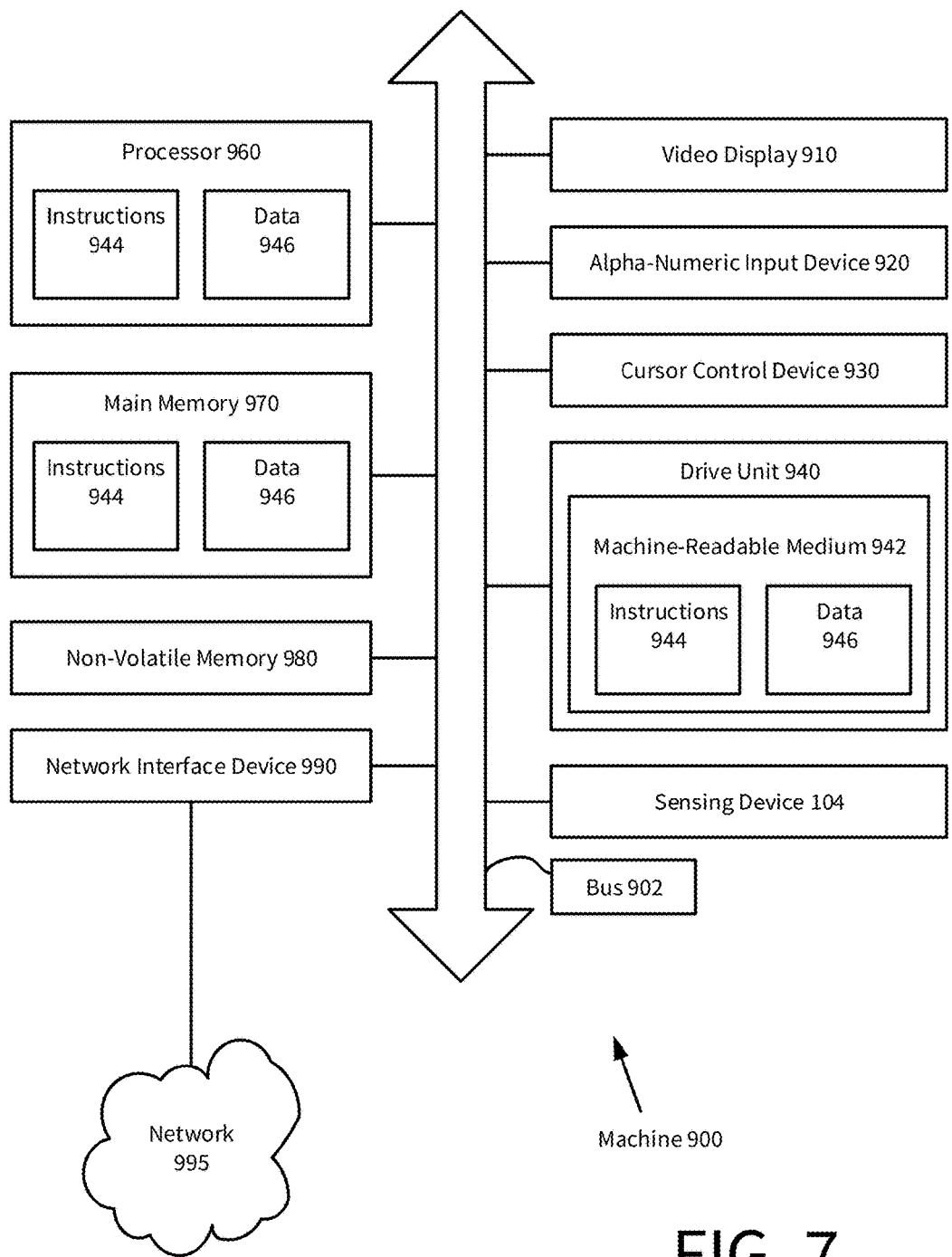
FIG. 7 is a diagrammatic representation of an embodiment of a machine, within which a set of instructions for causing the machine to perform one or more of the methods discussed herein.

FIG. 7 is a diagrammatic representation of an embodiment of a machine 900, within which a set of instructions for causing the machine to perform one or more of the methods discussed herein. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with a server to facilitate operations of the server and/or to access the operation of the server. In some embodiments, the machine may act as a server for some functions and a client for other functions.

In some embodiments, the machine 900 is the system 150 according to an embodiment as described herein or a component of such systems, such as one or more processors that make up the system 150. In other embodiments, the machine 900 is the database system 110 according to an embodiment as described herein.

The machine 900 includes a processor 960 (e.g., a central processing unit (CPU), a graphics processing unit (GPU) or both), a main memory 970 and a nonvolatile memory 980, which communicate with each other via a bus 902. In some embodiments, the machine 900 may be a cluster of computers or comprise multiple processors or multiple processor cores. In one embodiment, the machine 900 also includes a video display 910, an alphanumeric input device 920 (e.g., a keyboard), a cursor control device 930 (e.g., a mouse), a drive unit 940 (e.g., solid state drive (SSD), hard disk drive, Digital Versatile Disk (DVD) drive, or flash drive), a sensing device 950 (e.g., a speaker) and a network interface device 990.

In some embodiments, the machine 900 is includes the sensing device 104.

In some embodiments, the video display 910 includes a touch-sensitive screen for user input. In some embodiments, the touch-sensitive screen is used instead of a keyboard and mouse. The drive unit 940 includes a machine readable medium 942 on which is stored one or more sets of instructions 944 (e.g. software) embodying any one or more of the methods or functions of the inventive subject matter.

The instructions 944 may also reside, completely or partially, on machine-readable media within the main memory 940 and within machine-readable media within the processor 960 during execution thereof by the machine 900. The instructions 944 may also be transmitted or received over a network 995 via the network interface device 990. In some embodiments, the main memory 970 and the machine-readable medium 942 also includes a data 946 including the scan information or the point clouds.

While the machine-readable medium 942 is shown in an exemplary embodiment to be a single medium, the term "machine-readable medium" should be taken to include a single medium or multiple media (e.g., a centralized or distributed database, and/or associated caches and servers) that store the one or more sets of instructions and/or data. The term "machine readable medium" shall also be taken to include any non-transitory medium that is capable of storing, encoding or carrying a set of instructions for execution by the machine and that cause the machine to perform any one or more of the methods or functions of the inventive subject matter. The term "machine-readable medium" shall accordingly be taken to include, but not be limited to, solid-state memories, optical and magnetic media, and other non-transitory tangible media.

In general, the methods executed to implement the embodiments of the disclosure, may be implemented as part of an operating system or a specific application, component, program, object, module or sequence of instructions referred to as "programs." For example, one or more programs may be used to execute specific processes according to the inventive subject matter. The programs typically comprise one or more instructions set at various times in various memory and storage devices in the machine, and that, when read and executed by one or more processors, cause the machine to perform operations to execute methods, functions and other elements of the inventive subject matter.

Moreover, while embodiments have been described in the context of machines, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include, but are not limited to, recordable type media such as volatile and non-volatile memory devices, solid state drives (SSDs), flash memory devices, floppy and other removable disks, hard disk drives, and optical disks such as Compact Disk Read-Only Memory (CD-ROMS) and Digital Versatile Disks (DVDs), among others.

Figure 8:
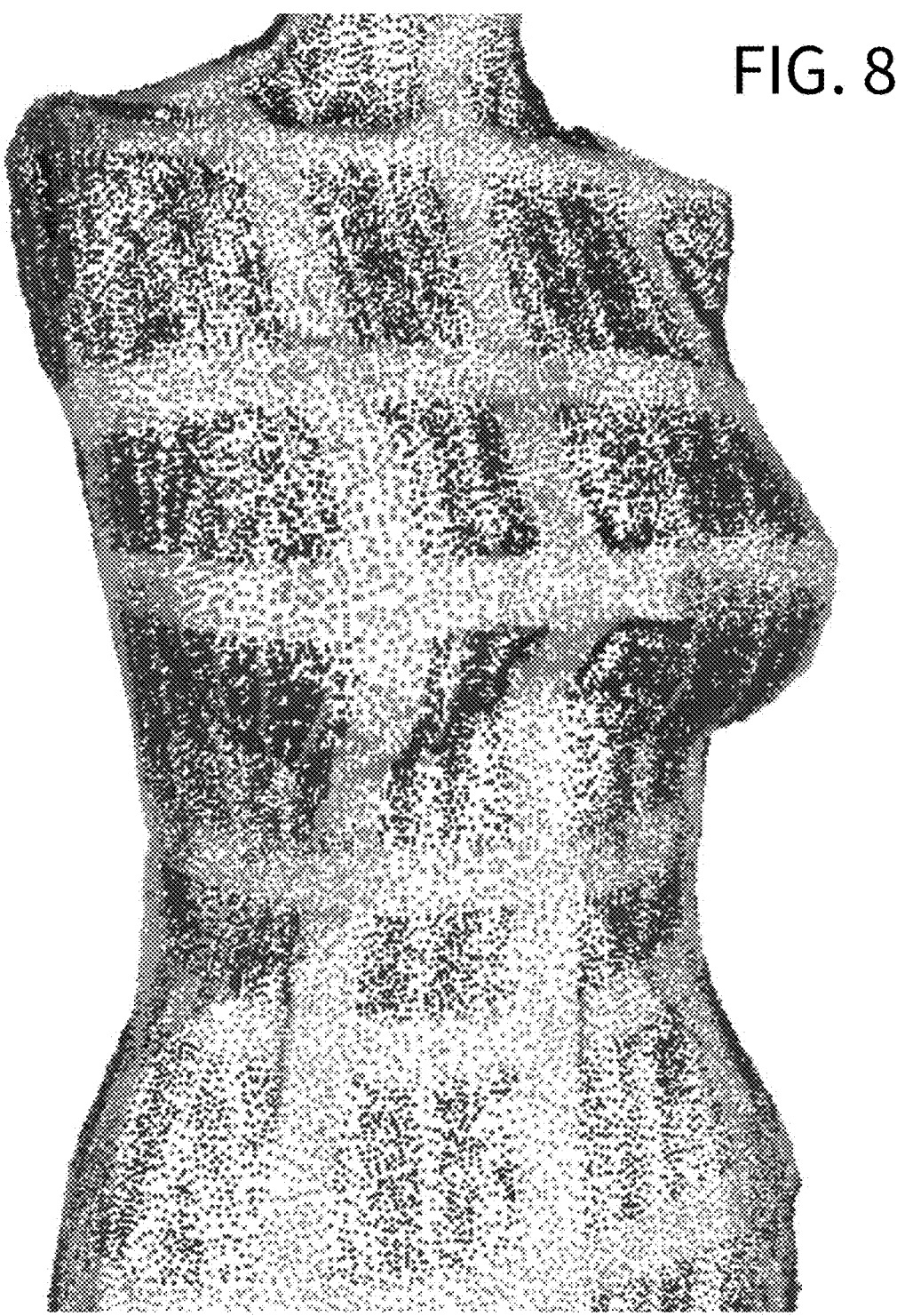
FIG. 8 shows one embodiment of a torso portion of the point cloud for a reference mannequin.

FIG. 8 illustrates one embodiment of the torso portion of a point cloud for a reference mannequin. The point cloud defines the surface shape of the portion of the reference mannequin.

The torso portion of the point cloud for an avatar might look very similar except that the color and texture of the surface of the avatar would be different than that of the mannequin.

Figure 9:
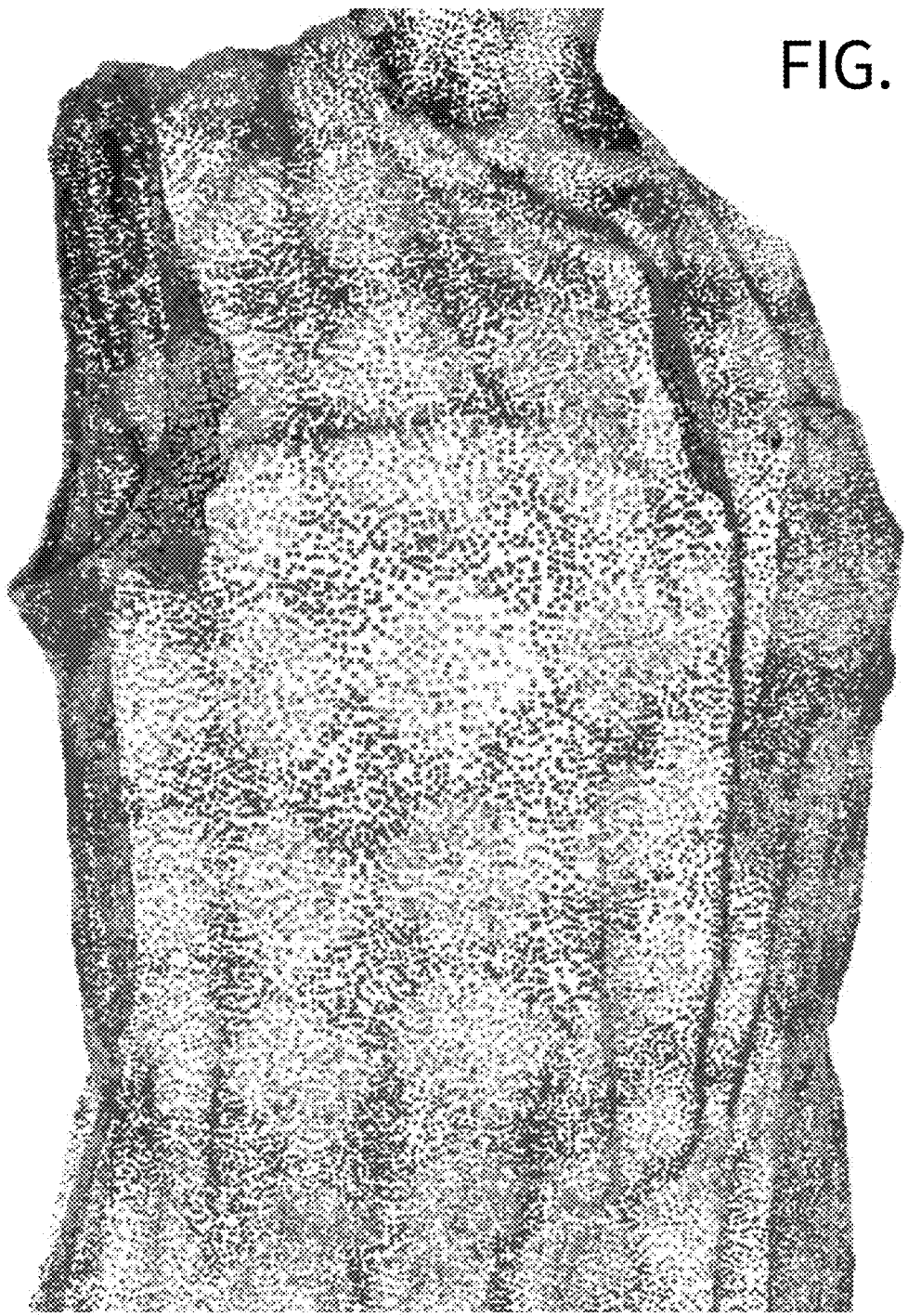
FIG. 9 shows one embodiment of a torso portion of the point cloud for a reference mannequin wearing a blouse.

FIG. 9 illustrates one embodiment of the torso portion of a point cloud for a reference mannequin wearing a blouse. The point cloud defines the surface shape of the portion of the blouse where it covers the torso, and the surface shape of the torso where the blouse does not cover the torso—in this case the neck.

The torso portion of the point cloud for an avatar dressed with a blouse might look very similar except that the color and texture of the surface of the avatar would be different than that of the mannequin.

What is claimed is:

1. A system for creating a model of a wearable having a surface, the system comprising:
   an object comprising a portion of a human form, the portion of the human form having a body surface;
   a sensing device configured to scan the body surface of the object without the wearable to generate a first scan information and configured to scan the surface of the wearable on the portion of the human form to generate a second scan information;
   a processor communicatively coupled to the sensing device to receive the first and second scan information, the processor configured to:
   (a) generate a first point cloud using the first scan information and a second point cloud using the second scan information;
   (b) align the first and second point clouds;
   (c) generate a plurality of slices along at least one longitudinal axis through the first and second point clouds, each slice having a centroid along a corresponding longitudinal axis;
   (d) generate a table having a plurality of entries each representing a distance between corresponding vertices for the first and second point clouds; and
   a storage means for storing the table representing the wearable.

2. The system of claim 1 wherein the sensing device comprises a three-dimension depth sensor.

3. The system of claim 1 wherein the sensing device comprises a camera.

4. The system of claim 1 wherein the processor is configured to align the first and second point clouds by identifying at least one feature of the human form in both the first and second point clouds.

5. The system of claim 4 wherein the at least one feature comprises at least one of a neck, shoulder, armpit, bust and crotch.

6. The system of claim 1 wherein the processor is configured to align the first and second point clouds by applying a smoothing filter to the centroid positioning along each longitudinal axis.

7. The system of claim 1 wherein the processor is further configured to extract from the first scan information, a color and a relative position for each point of the first point cloud; and extract from the second scan information, a color and a relative position for each point of the second point cloud.

8. The system of claim 1 wherein the sensing device is in a fixed position relative to the portion of the human form to capture the first and second scan information.

9. The system of claim 1 wherein the sensing device is moved relative to the portion of the human form to capture the first and second scan information.

10. The system of claim 1 wherein the portion of the human form is moved relative to the sensing device to capture the first and second scan information.

11. The system of claim 1 wherein the processor is further configured to identify at least one physical cue in both the first and second point clouds, wherein the first and second point clouds are aligned using the physical cue identified in each of the first and second point clouds.

12. A system for creating a model of a wearable having a surface, the system comprising:
    an object comprising a portion of a human form, the portion of the human form having a body surface;
    a sensing device configured to scan the body surface of the object without the wearable to generate a first scan information and configured to scan the surface of the wearable on the portion of the human form to generate a second scan information;
    a processor communicatively coupled to the sensing device to receive the first and second scan information, the processor configured to:
    (a) generate a first point cloud using the first scan information and a second point cloud using the second scan information;
    (b) align the first and second point clouds;
    (c) generate a plurality of slices along at least one longitudinal axis through the first and second point clouds, each slice having a centroid along a corresponding longitudinal axis;
    (d) apply a smoothing filter to the centroid positioning along at least one longitudinal axis; and
    (e) generate a table having a plurality of entries each representing a distance between corresponding vertices for the first and second point clouds; and
    a storage means for storing the table representing the wearable.

13. The system of claim 12 wherein the sensing device comprises a three-dimension depth sensor.

14. The system of claim 12 wherein the sensing device comprises a camera.

15. The system of claim 12 wherein the processor is configured to align the first and second point clouds by identifying at least one feature of the human form in both the first and second point clouds.

16. The system of claim 15 wherein the at least one feature comprises at least one of a neck, shoulder, armpit, bust and crotch.

17. The system of claim 12 wherein the processor is further configured to extract from the first scan information, a color and a relative position for each point of the first point cloud; and extract from the second scan information, a color and a relative position for each point of the second point cloud.

18. The system of claim 12 wherein the sensing device is in a fixed position relative to the portion of the human form to capture the first and second scan information.

19. The system of claim 12 wherein the sensing device is moved relative to the portion of the human form to capture the first and second scan information.

20. The system of claim 12 wherein the portion of the human form is moved relative to the sensing device to capture the first and second scan information.

21. The system of claim 12 wherein the processor is further configured to identify at least one physical cue in both the first and second point clouds, wherein the first and second point clouds are aligned using the physical cue identified in each of the first and second point clouds.

22. A computer-implemented method of creating a model of a wearable having a surface, the method comprising:
    receiving a first point cloud representing at least a portion of a human form, the portion of the human form having a body surface;
    receiving a second point cloud representing at least a portion of a human form dressed with the wearable;
    aligning the first and second point clouds;
    generating slices of the first and second point clouds substantially along the longitudinal axes of the human form, each slice having a centroid along a corresponding longitudinal axis; and
    generating a table comprising distances between corresponding points in the first and second point cloud, wherein the table representing the wearable.

23. The computer-implemented method of claim 22 further comprising applying a smoothing filter to the centroid positioning along at least one longitudinal axis.

* * * * *